(12) United States Patent
Kamiyama et al.

(10) Patent No.: US 8,668,895 B2
(45) Date of Patent: Mar. 11, 2014

(54) PURIFYING METHOD FOR METALLIC SILICON AND MANUFACTURING METHOD OF SILICON INGOT

(75) Inventors: Yuma Kamiyama, Kyoto (JP); Kazuyoshi Honda, Osaka (JP); Yasuharu Shinokawa, Osaka (JP); Hiromasa Yagi, Osaka (JP); Tomofumi Yanagi, Osaka (JP); Kunihiko Bessho, Osaka (JP)

(73) Assignee: Panasonic Corporation, Osaka (JP)

( * ) Notice: Subject to any disclaimer, the term of this patent is extended or adjusted under 35 U.S.C. 154(b) by 884 days.

(21) Appl. No.: 12/440,531

(22) PCT Filed: Jun. 24, 2008

(86) PCT No.: PCT/JP2008/001627
§ 371 (c)(1),
(2), (4) Date: Mar. 9, 2009

(87) PCT Pub. No.: WO2009/001547
PCT Pub. Date: Dec. 31, 2008

(65) Prior Publication Data
US 2009/0280049 A1    Nov. 12, 2009

(30) Foreign Application Priority Data

Jun. 26, 2007    (JP) .................................. 2007-167135

(51) Int. Cl.
*C01B 33/037* (2006.01)
(52) U.S. Cl.
USPC ......................................... 423/348; 423/350
(58) Field of Classification Search
USPC .................. 423/324, 348, 349, 350
See application file for complete search history.

(56) References Cited

U.S. PATENT DOCUMENTS

| | | | | |
|---|---|---|---|---|
| 6,036,932 A | * | 3/2000 | Hongu et al. | ................... 423/348 |
| 2005/0074388 A1 | * | 4/2005 | Baluais et al. | ................... 423/348 |

FOREIGN PATENT DOCUMENTS

| | | | |
|---|---|---|---|
| JP | 60-195016 A | | 10/1985 |
| JP | 62-292613 A | | 12/1987 |
| JP | 1-176211 A | | 7/1989 |
| JP | 5-33070 A | | 2/1993 |
| JP | 6-227808 A | | 8/1994 |
| JP | 10-182134 A | | 7/1998 |
| JP | 2005-231956 A | | 9/2005 |
| JP | 2006-27940 A | | 2/2006 |
| JP | 2006-232658 A | | 9/2006 |
| JP | 2006232658 A | * | 9/2006 |

OTHER PUBLICATIONS

International Search Report issued Sep. 22, 2008 in International application No. PCT/JP2008/001627, 2 pages.

* cited by examiner

*Primary Examiner* — Colleen Dunn
*Assistant Examiner* — Syed Iqbal
(74) *Attorney, Agent, or Firm* — Brinks Gilson & Lione

(57) ABSTRACT

In a purifying method for metal grade silicon, metal grade silicon with a silicon concentration not less than 98 wt % and not more than 99.9 wt % is prepared. The metal grade silicon contains aluminum not less than 1000 ppm and not more than 10000 ppm by weight. The metal grade silicon is heated at a temperature not less than 1500° C. and not more than 1600° C. in an inert atmosphere under pressure not less than 100 Pa and not more than 1000 Pa, and maintained at the temperature in the atmosphere for a predetermined period.

10 Claims, 3 Drawing Sheets

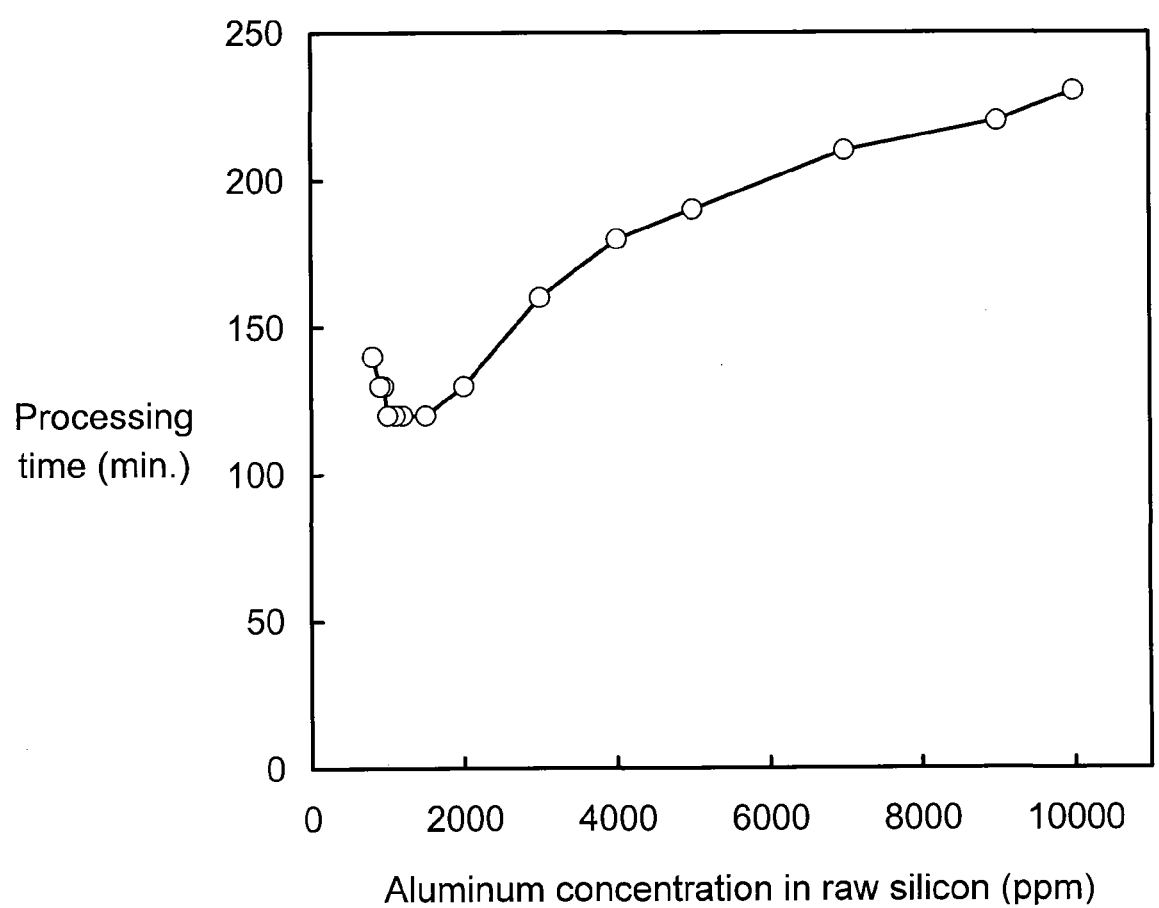

PURIFYING METHOD FOR METALLIC SILICON AND MANUFACTURING METHOD OF SILICON INGOT

TECHNICAL FIELD

The present invention relates to a purifying method for metallic silicon (metal grade silicon) and a manufacturing method of silicon ingots using the purification method.

BACKGROUND ART

In recent years, a silicon thin film prepared by vapor deposition technique has achieved widespread acceptance in the various technical fields. To prepare such a silicon thin film, silicon undergoes heating, such as resistance heating, induction heating, and electron-beam heating. In the electron-beam heating, the application of heat is localized to the surface of silicon as an evaporation source. Therefore, the electron-beam heating effectively increases evaporation speed compared to the resistance heating and the induction heating where the whole silicon as the evaporation source has to be heated.

In the electron-beam heating, however, a small region of the surface exposed to electron beams undergoes fast-paced heating. Silicon as the evaporation source often contains water and low-boiling impurities, such as organic material, phosphorus, calcium, and aluminum. For example, metal grade silicon made by reducing natural silicon oxide contains a large amount of aluminum.

When such metal grade silicon is used for the evaporation source, sharply accelerated evaporation of low-boiling impurities allows the silicon to spatter and attach on the surface of a thin film to be processed. This affects the quality of the film, such as in thickness and composition. Besides, the evaporation substrate can suffer damage due to the silicon spatter. In particular, during continuous feeding of solid silicon or a melting process of solid silicon in batch feeding, namely when solid silicon remains in the evaporation source, a sharp increase in temperature of heating easily causes the silicon spattering. This is because the fact that solid silicon has a density smaller than silicon-melt and accordingly solid silicon tends to stay on the surface.

To suppress the silicon spattering due to fast-paced heating in the melting process, it is effective that the vapor pressure on aluminum impurities is set lower than the furnace pressure. When a dilute solution is heated, the vapor pressure of the solvent and the solute of the solution can be determined on Raoult's law and/or Henry's law. Similarly, when solid silicon that contains impurities is heated, decreasing the concentration of low-boiling impurities allows the saturated vapor pressure thereof to be lower, suppressing vigorous evaporation.

Solid solubility of aluminum to solid silicon depends on the temperature; in the range from 1200° C. to 1400° C., the solubility of aluminum to solid silicon is approx. 500 ppm (by weight). That is, aluminum having a concentration equal to or lower than 500 ppm is soluble in silicon, and it is rarely deposited on the grain boundary, which suppresses vigorous evaporation of aluminum when melting. On the other hand, when aluminum with higher concentration is included in silicon, indissoluble aluminum gathers on the grain boundary, whereby a highly aluminum-concentrated region is formed. Therefore, in a case where silicon as the evaporation source has an aluminum concentration higher than 500 ppm, aluminum vigorously evaporates in the electron-beam heating. This is because the fact that silicon-melt having a high aluminum concentration is formed locally on the aluminum-concentrated grain boundary. In this way, vigorous evaporation of aluminum allows silicon to easily spatter.

For producing semiconductors and solar cells, silicon requires to have purity of 99.99% or higher. When remnants of silicon used above (i.e., scrap silicon) are employed for the evaporation source, the silicon spattering is suppressed. However, there is a great demand for such a highly purified silicon, and accordingly, it is hard-to-get and highly expensive material.

Under these circumstances, to obtain a low-cost evaporation source, a suggestion—where silicon purified by a metallurgical method (the so-called metal grade silicon) is prepared as a raw material—has been made. Having a purity of approx. 98%, metal grade silicon contains low-boiling impurities such as phosphorus, calcium, and aluminum as mentioned above.

On the other hand, as a purification method to obtain silicon having impurities lower than 1 ppm, i.e., having purity high enough for producing solar cells, some suggestions have been made. Specifically, Patent documents 1 and 2 show well-known methods where silicon is purified by heating in the atmosphere under a reduced pressure.

According to the methods shown in Patent documents 1 and 2, the purification is carried out under high vacuum condition (not greater than 10 Pa). In such an atmosphere, the low-boiling impurities evaporate at a high speed, which easily invites silicon spattering in the purifying process. Therefore, the purification carried out under high vacuum condition is inappropriate for purifying metal grade silicon containing aluminum of 1000 ppm or higher.

Patent document 3 shows a purifying method to obtain silicon with purity of 98 to 99%. According to the method, impurities are removed by an elution process with the use of acid. The method, however, cannot reduce the concentration of aluminum impurity to 500 ppm or lower.

As described above, in the case where metal grade silicon containing aluminum of 1000 ppm or higher is used as a raw material, conventional methods have brought little success in reducing the concentration of aluminum impurity to 500 ppm or less with no use of chemical technique.

Patent document 1: Japanese Patent Unexamined Publication No. H06-227808
Patent document 2: Japanese Patent Unexamined Publication No. 2006-232658
Patent document 3: Japanese Patent Unexamined Publication No. H05-33070

SUMMARY OF THE INVENTION

The method for purifying metal grade silicon of the present invention is described based on the premise that metal grade silicon is formed of silicon having a concentration not less than 98 wt % and not more than 99.9 wt % and other impurities including a metal. Of the impurities, aluminum has a concentration not less than 1000 ppm and not more than 10000 ppm by weight.

In the purifying method for metal grade silicon of the present invention, first, the metal grade silicon that satisfies the conditions above is prepared. Next, the metal grade silicon is heated at a temperature ranging from 1500° C. to 1600° C., inclusive, in the atmosphere under pressure ranging from 100 Pa to 1000 Pa, inclusive, and maintained the metal grade silicon at the temperature in the atmosphere for a predetermined period. The purifying method for metal grade silicon effectively removes aluminum from the metal grade silicon.

The manufacturing method of silicon ingot of the present invention has preparing metal grade silicon; heating the metal grade silicon at a temperature ranging from 1500° C. to 1600° C., inclusive, in the atmosphere under pressure ranging from 100 Pa to 1000 Pa, inclusive, and maintaining the metal grade silicon at the temperature in the atmosphere for a predetermined period; and cooling down the metal grade silicon to obtain a silicon ingot.

BRIEF DESCRIPTION OF THE DRAWINGS

FIG. 3 shows processing time required for metal grade silicon with different concentration of aluminum to decrease the concentration to 500 ppm.

Figure 1:
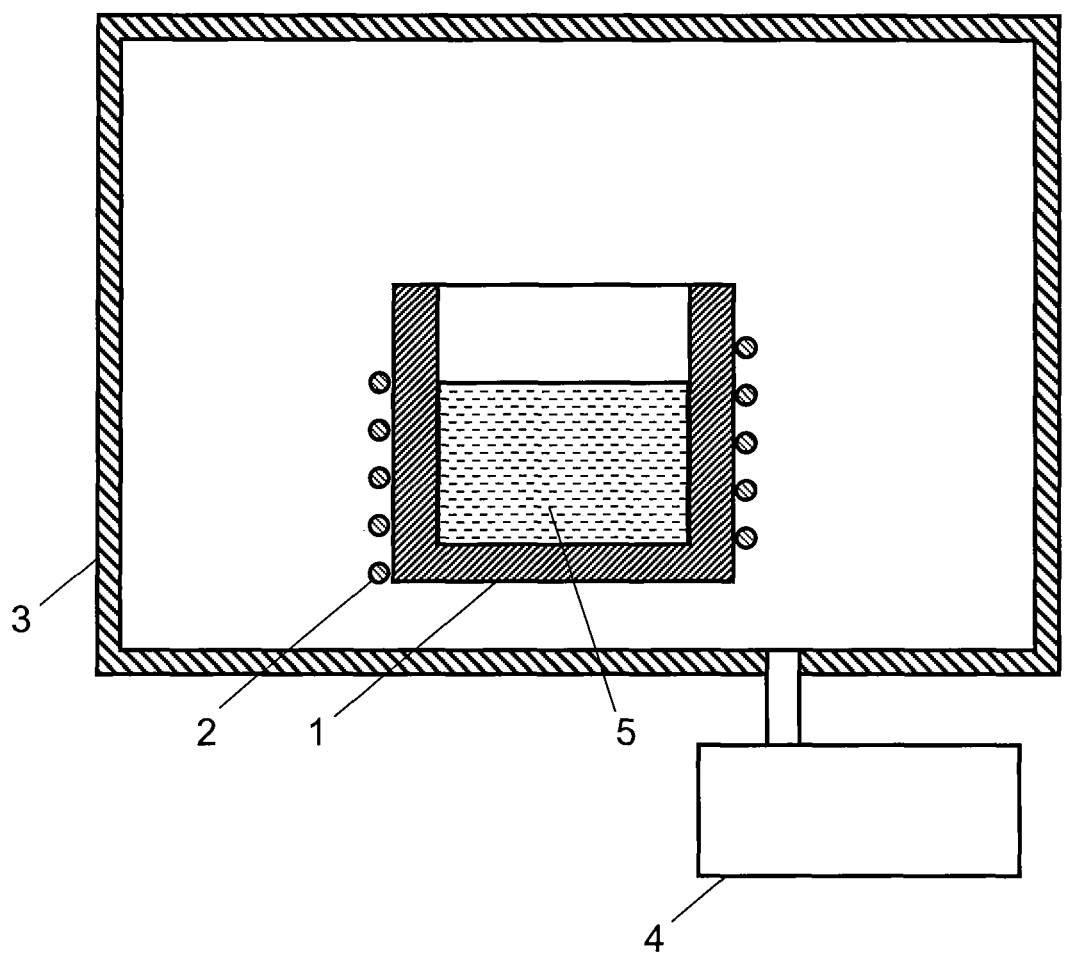
FIG. 1 shows a structure of melting equipment used for purifying metal grade silicon in accordance with an exemplary embodiment of the present invention.

| REFERENCE MARKS IN THE DRAWINGS | |
|---|---|
| 1 | crucible |
| 2 | coil |
| 3 | chamber |
| 4 | vacuum pump |
| 5 | raw silicon |

DETAILED DESCRIPTION OF THE INVENTION

FIG. 1 shows a structure of melting equipment used for purifying metal grade silicon in accordance with an exemplary embodiment of the present invention. The melting equipment has crucible 1 that is a container for holding raw silicon 5, coil 2 as a heating section, chamber 3 and vacuum pump 4.

Crucible 1 is disposed in chamber 3. After having inert-gas substitution by argon and the like, inside of chamber 3 is reduced in pressure by vacuum pump 4. That is, the ambient environment of crucible 1 is maintained in an inert atmosphere including inert gas such as argon under reduced pressure ranging from 100 Pa to 1000 Pa, inclusive. Coil 2 is disposed around crucible 1. Applying a high-frequency current to coil 2 allows crucible 1 to have induction heating.

Raw silicon (i.e., metal grade silicon) 5 in crucible 1 has a silicon concentration ranging from 98 wt % to 99.9 wt %, inclusive, and contains aluminum as an impurity. Raw silicon 5 is heated by coil 2 at a temperature ranging from 1500° C. to 1600° C., inclusive, and the temperature of raw silicon 5 is maintained for a predetermined period. In other words, raw silicon 5 is maintained within the temperature range for a predetermined period. The method above effectively removes aluminum from raw silicon 5. Such heated and maintained metal grade silicon is then cooled down and formed into a silicon ingot suitable for material of a thin film.

If the aforementioned process is carried out under reduced pressure lower than 100 Pa, low-boiling impurities, such as phosphorus, calcium, and aluminum, evaporate at an increasingly fast pace, which invites bumping. The bumping increases material spattering, resulting in significantly reduced yield of the materials. At the same time, the bumping also invites spattering of hot silicon-melt, which can cause damage of the equipment. On the other hand, carrying out the process under reduced pressure higher than 1000 Pa decreases the evaporation speed of the impurities. Besides, the residue of oxygen in chamber 3 easily increases, which accelerates oxidation of the surface of raw silicon 5 and hampers evaporation of the impurities.

If the process is carried out at a temperature lower than 1500° C., silicon oxide evaporates at slow speed, and therefore an oxide film over the surface of melted raw silicon 5 is hard to be removed. The oxide film prevents aluminum from evaporation, deteriorating efficiency of purification. On the other hand, carrying the process at a temperature higher than 1600° C. increases the evaporation speed of the low-boiling impurities, which invites bumping. This causes silicon spattering, increasing material loss in silicon.

Considering above, aluminum is effectively removed from raw silicon 5 at a temperature ranging from 1500° C. to 1600° C., inclusive, in an inert atmosphere under reduced pressure ranging from 100 Pa to 1000 Pa, inclusive. That is, carrying out the aforementioned process under the aforementioned conditions not only prevents evaporation block, which is caused by an oxide film formed on the melted surface of raw silicon 5, but also suppresses material loss in silicon due to bumping. As a result, aluminum is effectively removed from raw silicon 5.

Raw silicon 5 is not necessarily heated by induction heating; resistance heating where raw silicon 5 is heated via crucible 1 by a heater, and electron-beam heating may be employed. In terms of heating efficiency, induction heating is better than resistance heating. Furthermore, in terms of recovery efficiency affected by bumping, induction heating is better than electron-beam heating.

To protect melted silicon from oxidation, it is preferable that crucible 1 is made of non-oxygenated material, such as graphite, silicon carbide and silicon nitride.

The method of the embodiment is effective in raw silicon 5 having aluminum concentration higher than 1000 ppm, like metal grade silicon obtained by reducing natural silicon oxide. When raw silicon 5 containing impurities with a low concentration is put in crucible 1 and heated by induction heating, the heating efficiency in the early stage of heating is decreased because of a large electrical resistance. For this reason, the method using induction heating has a preferable effect on raw silicon 5 having aluminum concentration higher than 1000 ppm.

On the other hand, increase in impurity concentration needs a longer time for impurities to evaporate. As silicon evaporates, volatiles accumulate inside chamber 3, so that chamber 3 cannot maintain a proper level of cleanliness. Considering above, it is preferable that raw silicon 5 contains aluminum equal to or lower than 10000 ppm. That is, the method of the embodiment provides a preferable effect on raw silicon 5 having aluminum concentration ranging from 1000 ppm to 10000 ppm, inclusive. In terms of the efficiency of processing time, it is more preferable that the aluminum concentration is equal to or lower than 2000 ppm.

According to the method described above, it is preferable that the raw silicon maintains a proper temperature so that the weight ratio of aluminum in the silicon decreases down to the range from 100 ppm to 500 ppm, inclusive. Decreasing aluminum concentration to the range allows the raw silicon to be a silicon ingot suitable for producing a silicon thin film by electron-beam heating. For producing solar cells, the aluminum concentration needs to be further decreased. In terms of atmospheric pressure and temperature-holing time, a desired concentration is not expected by the method.

It is preferable that the ambient environment of raw silicon 5 is substituted by inert gas and the pressure of the inert-gas atmosphere is reduced prior to heating raw silicon 5. The aforementioned procedure suppresses formation of oxide film on the melted surface of raw silicon 5.

Hereinafter, showing specific experimental examples, the effect of the exemplary embodiment will be described. The conditions under which these experiments have been carried out are as follows:

- Crucible 1 is made of graphite. Crucible 1 has diameter of 25 mm, height of 100 mm.
- Coil 2 undergoes application of high-frequency current. The frequency is set to 82 kHz, and output is set to 7 kW.
- Raw silicon 5 is metal grade silicon containing a predetermined amount of aluminum. Weight thereof is 50 g; particle diameter is approx. 10 mm.

Experimental Example 1

Dependence on Processing Temperature

Raw silicon 5 containing aluminum of 3000 ppm is put in crucible 1 disposed in chamber 3 of a high-frequency melting furnace. Thereafter, pressure in chamber 3 is reduced and then an argon gas is installed into chamber 3 until the reduced pressure returns to the normal level so that chamber 3 has an argon atmosphere. Furthermore, pressure in chamber 3 is again reduced down to 760 Pa. With this condition, raw silicon 5 is heated by applying high frequency current of 82 kHz with output of 4 kW to coil 2, while cooling coil 2 by water distribution. In the heating process above, each of samples A through E, as shown in Table 1, is heated to a predetermined temperature in the range of 1450° C.-1650° C. After that, samples A to E are maintained at each temperature for a predetermined period on control of high-frequency output. That is, temperature of the each silicon sample is maintained until aluminum concentration in raw silicon 5 is reduced to 500 ppm.

The temperature of raw silicon 5 in the heating process is measured by an infrared radiometer. The temperature of crucible 1 is measured by a thermocouple (type B thermocouple). Type B thermocouple is made of a pair of platinum-rhodium alloys; one includes 30%-rhodium, and the other includes 6%-rhodium. According to the measurement values of temperature, high-frequency output is determined to maintain the temperature of raw silicon 5. After a lapse of each period shown in Table 1 from the start of heating, each sample is naturally cooled down to room temperature.

Figure 2:
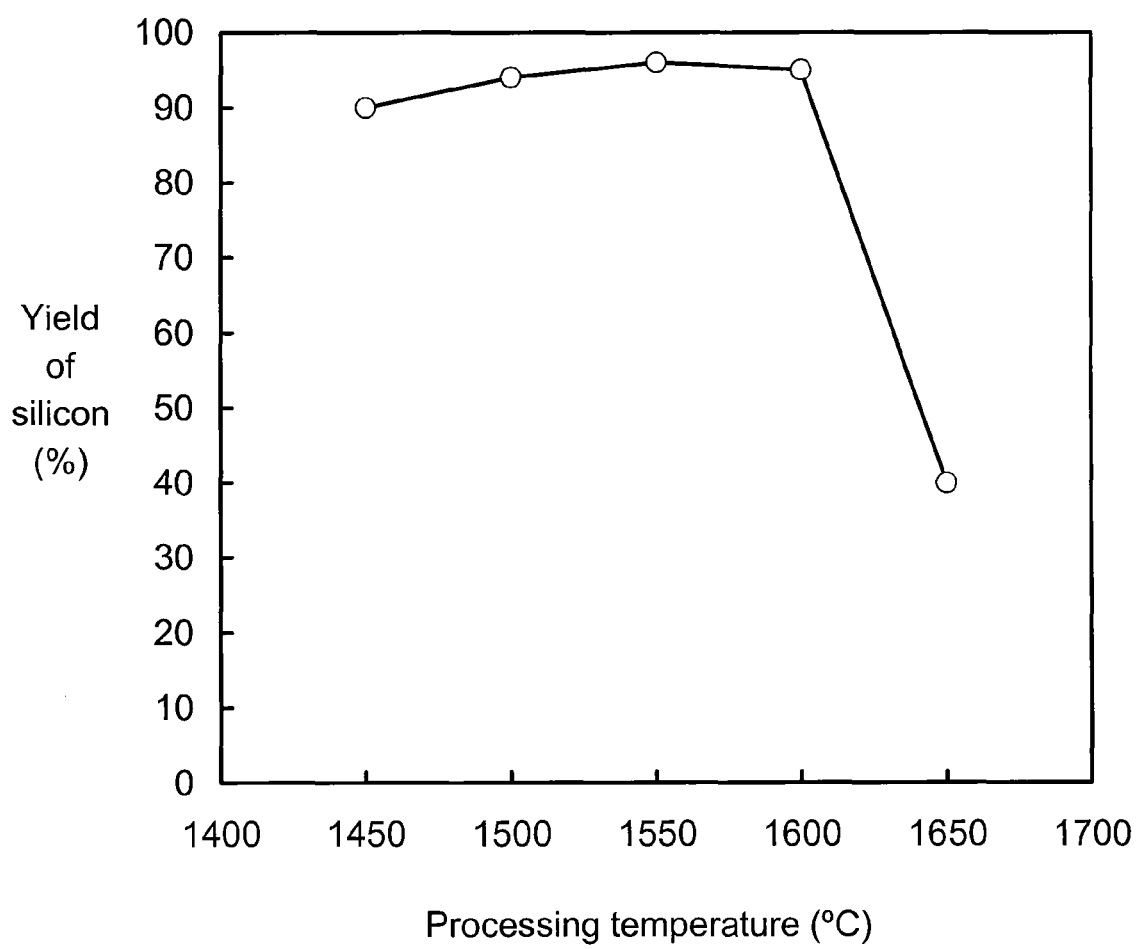
FIG. 2 shows changes in yield of silicon under the condition that metal grade silicon as a raw material has an aluminum concentration of 3000 ppm and the metal grade silicon undergoes temperature change so that the aluminum concentration is reduced to 500 ppm.

After the completion of the process, the yield of silicon is determined by measuring the weight percentage of silicon left in crucible 1 with respect to the weight of raw silicon 5 before the process. The component of each sample is analyzed by fluorescent X-ray analysis. Table 1 and FIG. 2 show the experiment result.

TABLE 1

| | Processing temperature (° C.) | Processing time | Yield of silicon (%) |
|---|---|---|---|
| Sample A | 1450 | 15 hrs | 90 |
| Sample B | 1500 | 7 hrs | 94 |
| Sample C | 1550 | 160 min. | 96 |
| Sample D | 1600 | 130 min. | 95 |
| Sample E | 1650 | 100 min. | 40 | aluminum concentration in raw silicon: 3000 ppm; processing pressure: 760 Pa

As shown in Table 1, in the case of sample B where the processing temperature is set at 1500° C., it takes 7 hours to reduce aluminum concentration to 500 ppm. Samples C and D are processed at 1550° C. and 1600° C., respectively. In these samples, the time required for reducing aluminum concentration to 500 ppm is shorter than the time required for sample B processed at 1500° C. Furthermore, as shown in Table 1 and FIG. 2, the process with temperature of at lowest 1500° C. and at highest 1600° C. effectively removes aluminum from silicon and achieved high yield of silicon.

On the other hand, samples A and E are processed at 1450° C. and 1650° C., respectively. In the case of sample A, as shown in Table 1, the heating process for long hours allows aluminum concentration in silicon to be decreased. However, a film is easily formed on the melted surface of raw silicon 5 and the surface is covered with the film, causing instability in evaporation speed. Decrease in the yield of silicon is led by the reason above. On the other hand, in the case of sample E, aluminum concentration is decreased in the shortest processing time. However, low-boiling impurities evaporate at an excessively fast speed, which causes silicon spattering due to bumping right after the melting started. As a result, the yield of silicon plunges to 40%.

Experimental Example 2

Dependence on Processing Pressure

The experiment is carried out in different pressure atmospheres ranging from 1.3 Pa to 1500 Pa in chamber 3. Other than the processing pressure above, the experiment on samples F through K is performed in the process given to sample C. In the experiment, raw silicon 5 containing 3000 ppm of aluminum is processed to reduce the aluminum concentration to 500 ppm. Table 2 shows the experiment result (samples F through K) together with the result of sample C.

TABLE 2

| | Processing pressure (Pa) | Processing time (min.) | Yield of silicon (%) |
|---|---|---|---|
| Sample F | 1500 | 240 | 95 |
| Sample G | 1000 | 170 | 96 |
| Sample C | 760 | 160 | 96 |
| Sample H | 100 | 160 | 96 |
| Sample J | 10 | 160 | 89 |
| Sample K | 1.3 | 160 | 90 | aluminum concentration in raw silicon: 3000 ppm; processing temperature: 1550° C.

In general understanding, a lower pressure atmosphere encourages evaporation of silicon. Table 2 shows little difference in the yield of silicon between sample F processed at 1500 Pa and sample H processed at 100 Pa. In contrast, sample K processed at 1.3 Pa and sample J processed at 10 Pa result in low yield of silicon.

A process with lower processing pressure encourages evaporation of aluminum and therefore it is expected that to shorten the processing time. However, in the experiment, a remarkable difference in processing time is not found in the pressure range from 1.3 Pa to 1000 Pa as shown in Table 2. That is, the advantage of shortening the processing time is not expected in a process with a processing pressure lower than 100 Pa. In contrast, compared to sample H with a processing pressure of 100 Pa, sample F with a processing pressure of 1500 Pa required 1.5-times longer processing time. In conclusion, it is preferable that the processing pressure is not less

Experimental Example 3

Dependence on Aluminum Concentration Before Process

Focused on difference in concentration of aluminum contained in raw silicon 5 before processing, the experiment is carried out on samples L through Y. The experiment procedure follows that of sample C. The samples of metal grade silicon, each of which has predetermined concentration of aluminum, are processed at a temperature of 1550° C. under reduced pressure of 760 Pa to decrease the aluminum concentration to 500 ppm. Table 3 and FIG. 3 show the experiment result (samples L through Y) together with the result of sample C.

TABLE 3

|  | Aluminum concentration in raw silicon (ppm) | Processing time (min.) |
|---|---|---|
| Sample L | 10000 | 230 |
| Sample M | 9000 | 220 |
| Sample N | 7000 | 210 |
| Sample P | 5000 | 190 |
| Sample Q | 4000 | 180 |
| Sample C | 3000 | 160 |
| Sample R | 2000 | 130 |
| Sample S | 1500 | 120 |
| Sample T | 1200 | 120 |
| Sample U | 1100 | 120 |
| Sample V | 1000 | 120 |
| Sample W | 950 | 130 |
| Sample X | 900 | 130 |
| Sample Y | 800 | 140 | processing temperature: 1550° C.; processing pressure: 760 Pa

The lower the aluminum concentration, the shorter the processing time; on the other hand, the lower the aluminum concentration, the longer the time required for initially heating raw silicon 5. Accordingly, in the case that aluminum concentration is decreased below 3000 ppm, the degree of reduction of the processing time with respect to aluminum concentration becomes slower, and when it is decreased to 1500 ppm, the processing time reaches minimum. In the aluminum-concentration range from 1500 ppm to 1000 ppm, the process for reducing aluminum concentration down to 500 ppm can be done in 120 minutes.

In the process on raw silicon 5 having aluminum concentration lower than above, heating efficiency of raw silicon 5 decreases and therefore it takes longer time for melting. Samples W through Y in which metal grade silicon with aluminum concentration lower than 950 ppm is used as a raw material shows poor efficiency of removing aluminum in spite of being heated under the condition the same as in sample C. The experiment results of samples W through Y prove that the processing time required for achieving aluminum concentration of 500 ppm is longer than that required for sample V employing raw silicon with aluminum concentration of 1000 ppm.

As is shown in the result above, in the process of heating raw silicon 5 by induction heating, it is preferable that aluminum concentration in raw silicon 5 is not less than 1000 ppm and not more than 10000 ppm; more preferably, it is not more than 2000 ppm in terms of the efficiency of processing time.

than 100 Pa and not more than 1000 Pa; more preferably, it is not less than 100 Pa and not more than 760 Pa.

INDUSTRIAL APPLICABILITY

The purifying method for metal grade silicon of the present invention effectively removes aluminum as an impurity contained in raw silicon. The method is useful for producing a silicon ingot as a material of a thin film. In addition, the present invention is also applicable to purity control of material of vapor deposition.

The invention claimed is:

1. A purifying method for metal grade silicon, comprising:
   (a) preparing metal grade silicon containing aluminum not less than 1000 ppm and not more than 10000 ppm by weight;
   (b) heating the metal grade silicon at a temperature not less than 1500° C. and not more than 1600° C. in an atmosphere under a pressure not less than 100 Pa and not more than 1000 Pa; and
   (c) maintaining the metal grade silicon at within the temperature and pressure ranges in the atmosphere for a predetermined period sufficient to reduce an aluminum content in the metal grade silicon to not less than 100 ppm and not more than 500 ppm by weight.

2. The purifying method for metal grade silicon according to claim 1, wherein the metal grade silicon is heated by induction heating.

3. The purifying method for metal grade silicon according to claim 1, wherein preparing a metal grade silicon comprises preparing a metal grade silicon containing aluminum not less than 1000 ppm and not more than 2000 ppm by weight.

4. The purifying method for metal grade silicon according to claim 1, wherein the metal grade silicon is retained in a container being resistant to oxidation of silicon while heated.

5. The purifying method for metal grade silicon according to claim 4, wherein the container is a crucible made of any one of graphite, silicon carbide and silicon nitride.

6. The purifying method for metal grade silicon according to claim 1, further comprising, prior to Step (b), filling an ambient environment of the metal grade silicon with an inert-gas and depressurizing the inert-gas atmosphere to within the pressure range.

7. The purifying method for metal grade silicon according to claim 1, wherein the metal grade silicon is heated and maintained in an inert-gas atmosphere with a pressure not less than 100 Pa and not more than 760 Pa.

8. The purifying method for metal grade silicon according to claim 1, wherein preparing metal grade silicon comprises reducing natural silicon oxide.

9. The purifying method for metal grade silicon according to claim 1, wherein the metal grade silicon having an aluminum content of not less than 100 ppm and not more than 500 ppm by weight is recovered at an yield equal to or more than 94%.

10. A manufacturing method of a silicon ingot, comprising:
   (a) preparing metal grade silicon containing aluminum not less than 1000 ppm and not more than 10000 ppm by weight;
   (b) heating the metal grade silicon at a temperature not less than 1500° C. and not more than 1600° C. in an atmosphere under a pressure not less than 100 Pa and not more than 1000 Pa;
   (c) maintaining the metal grade silicon at within the temperature and pressure ranges in the atmosphere for a predetermined period sufficient to reduce an aluminum content in the metal grade silicon to not less than 100 ppm and not more than 500 ppm by weight; and (d) cooling down the metal grade silicon after Step (c) to form a silicon ingot.

* * * * *